June 2, 1925.  
F. N. ROSS  
1,540,365  
BUTTON ATTACHING MACHINE  
Filed Aug. 4, 1923 12 Sheets-Sheet 1
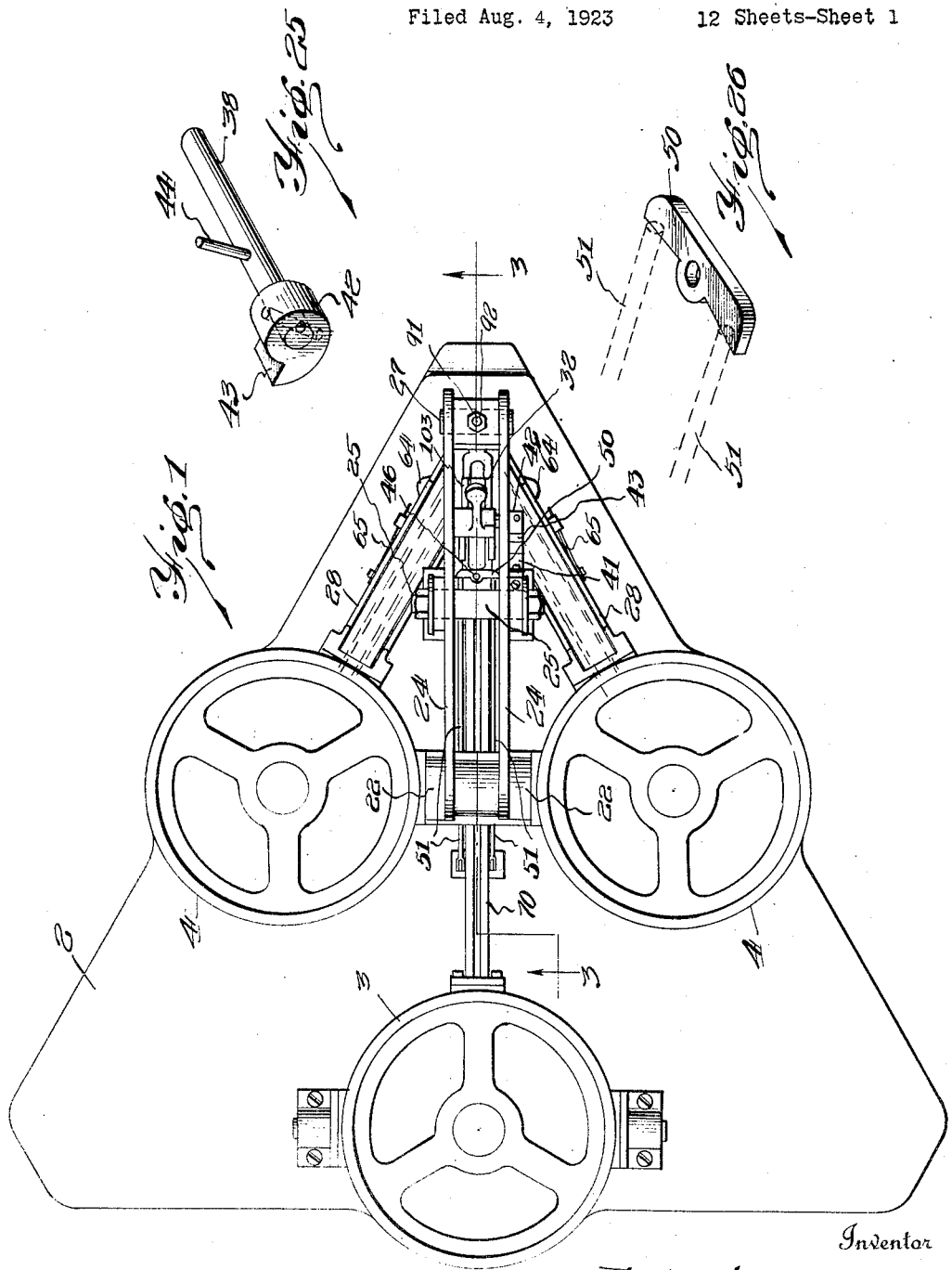
Inventor  
Frederick N. Ross,  
By Stuart C. Barnes  
Attorney

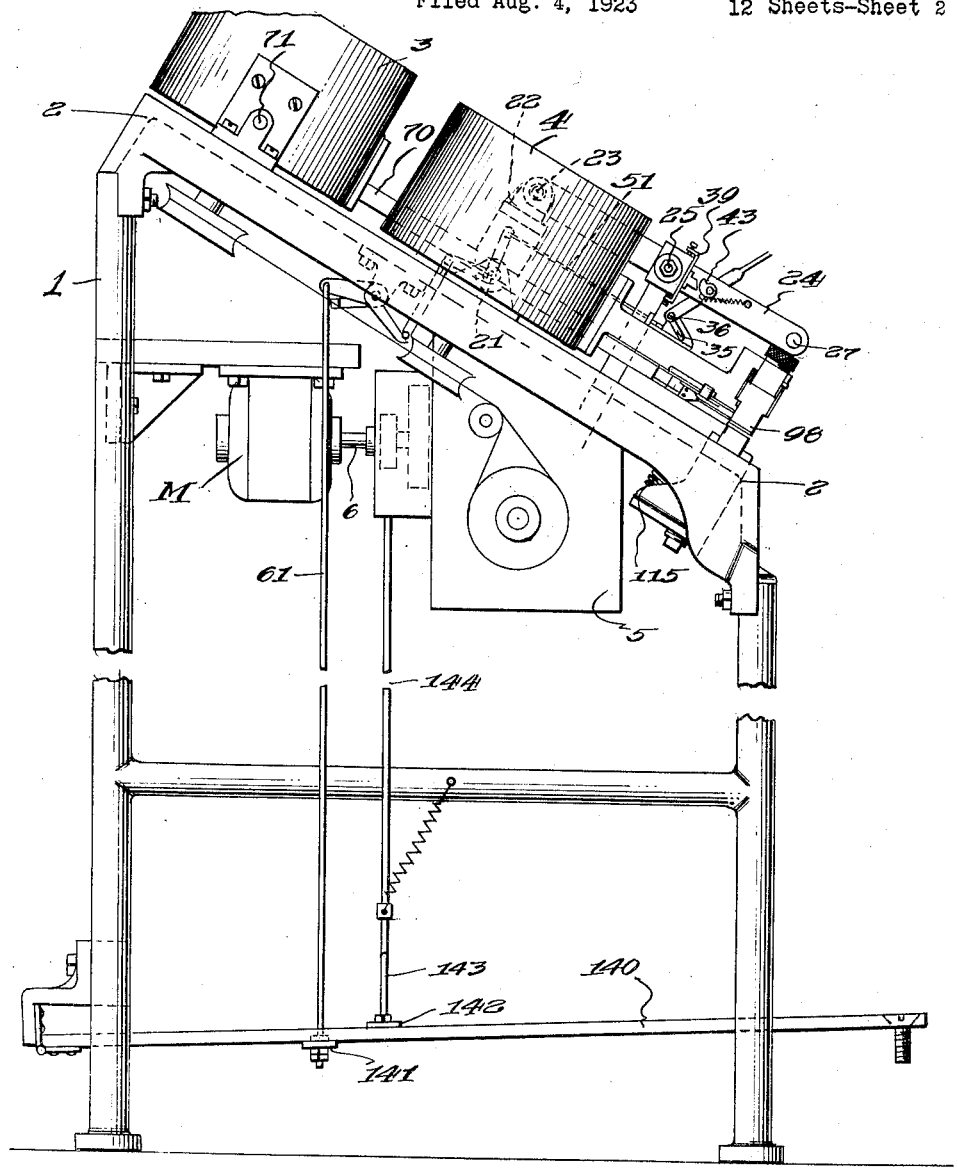

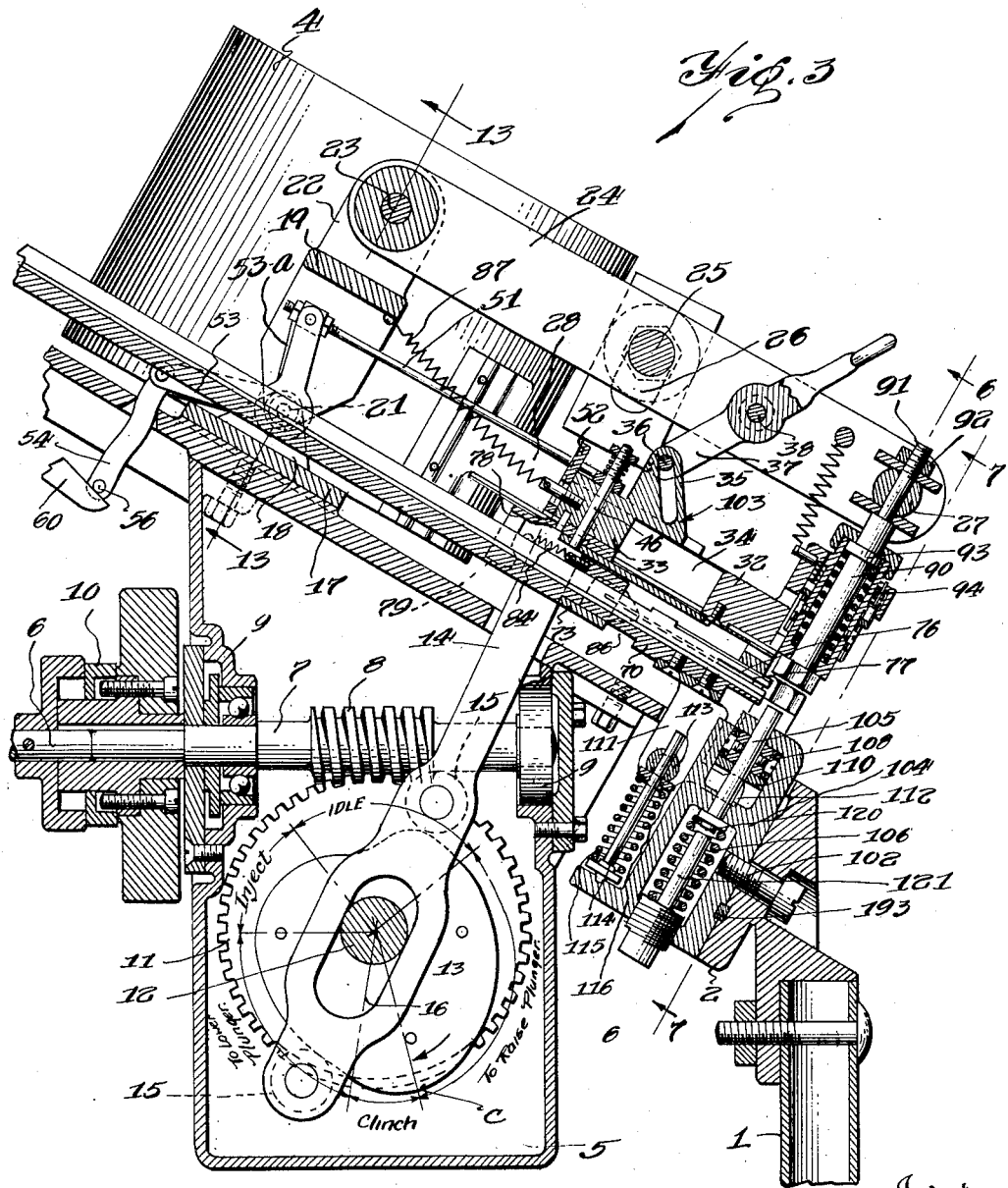

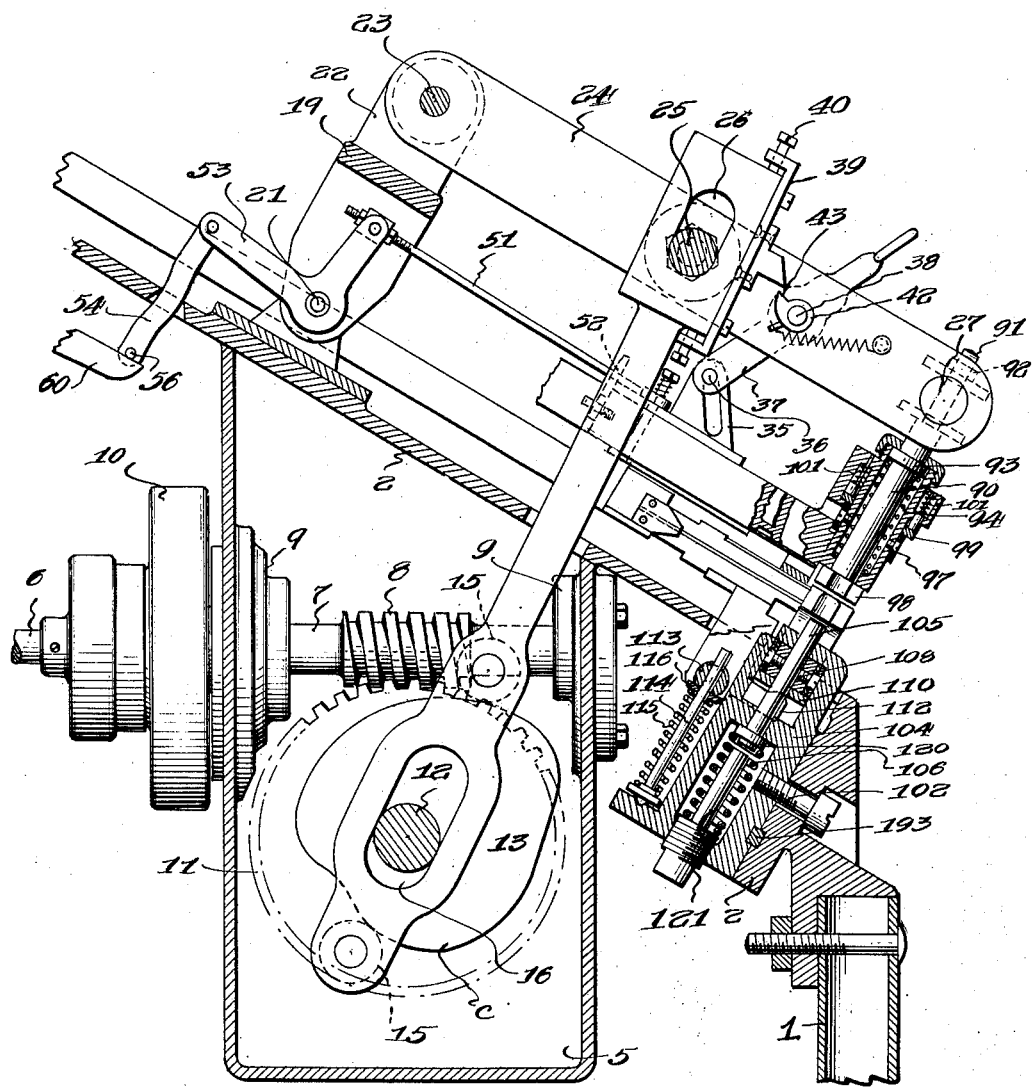

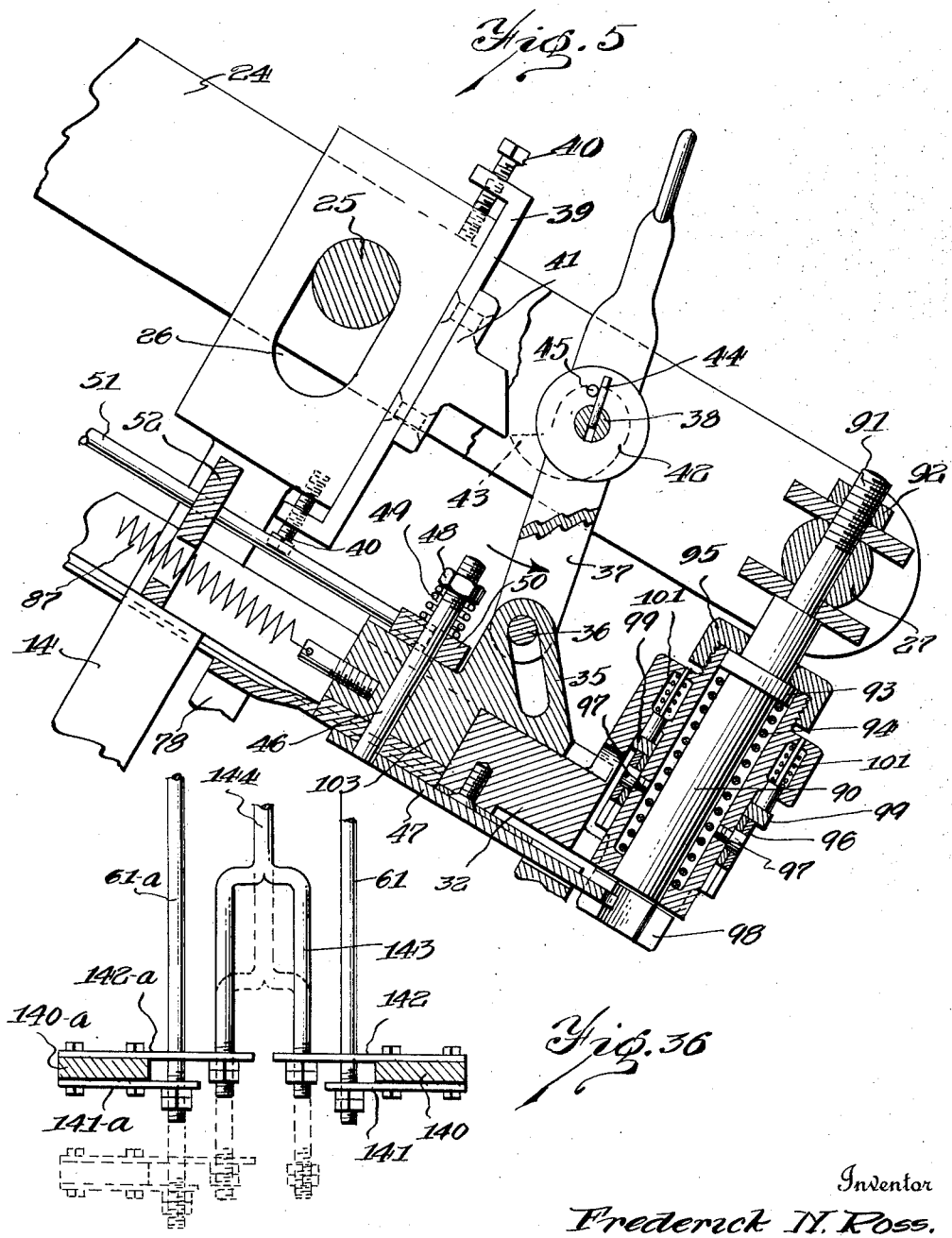

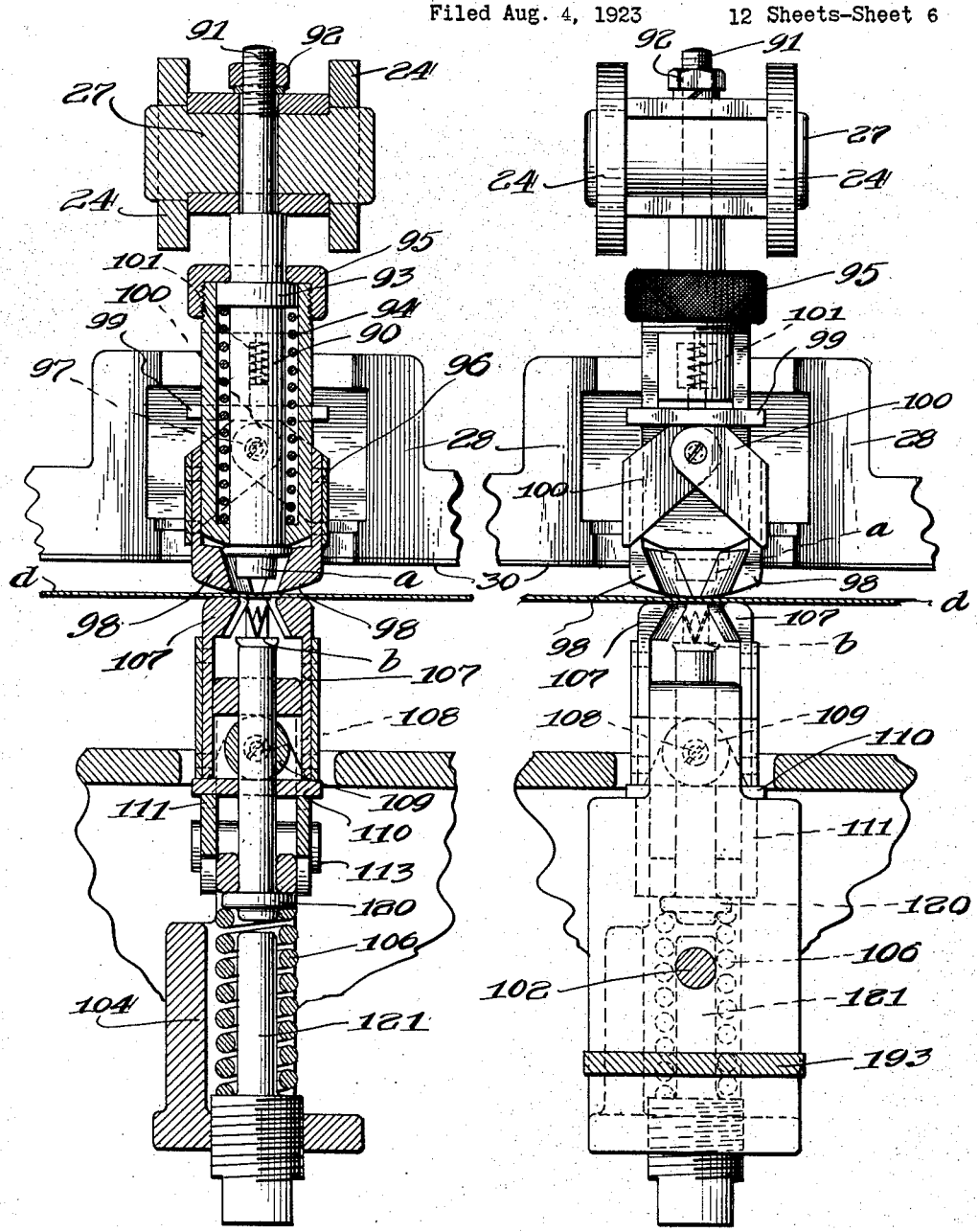

June 2, 1925.  1,540,365
F. N. ROSS
BUTTON ATTACHING MACHINE
Filed Aug. 4, 1923   12 Sheets-Sheet 7
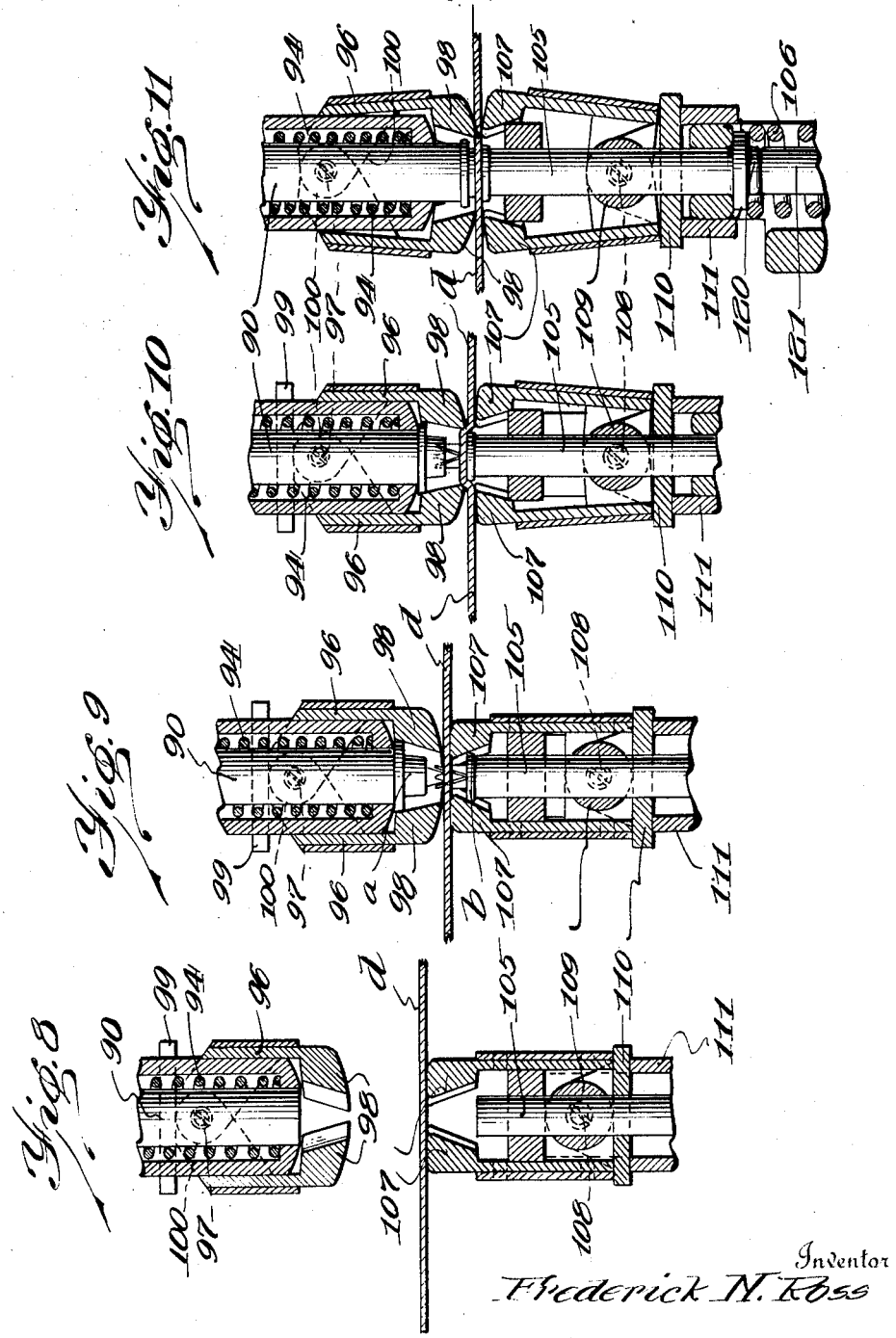

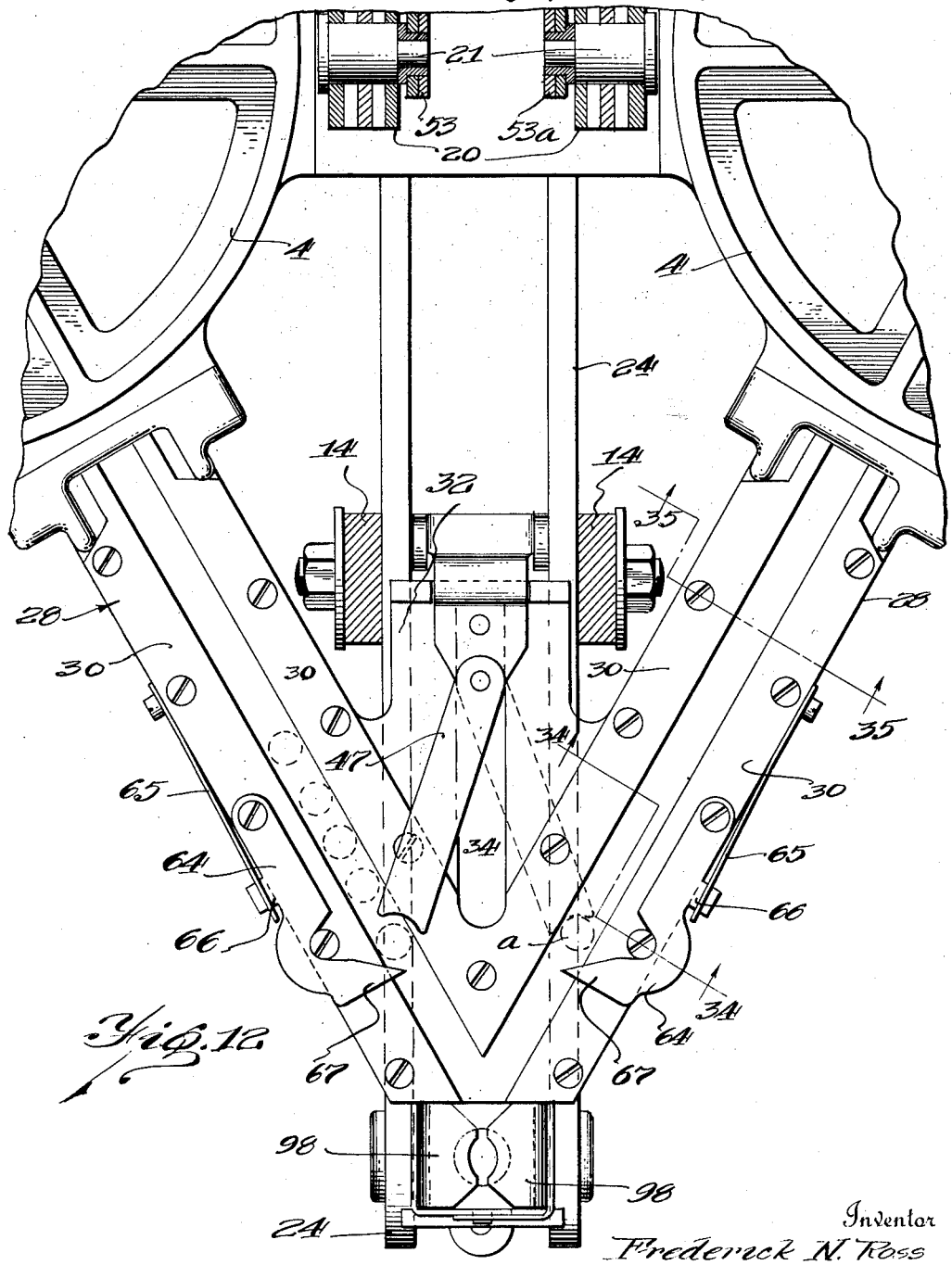

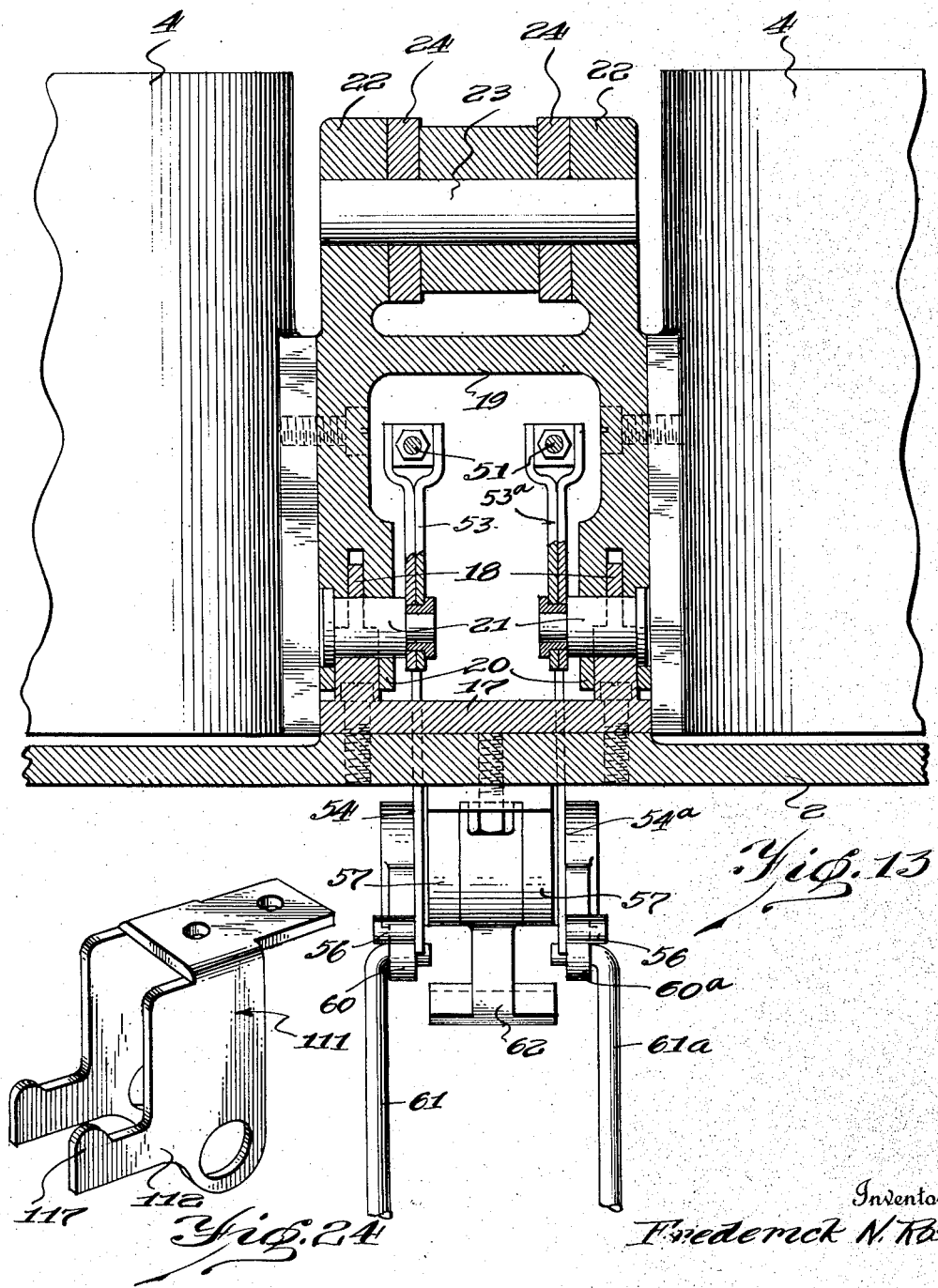

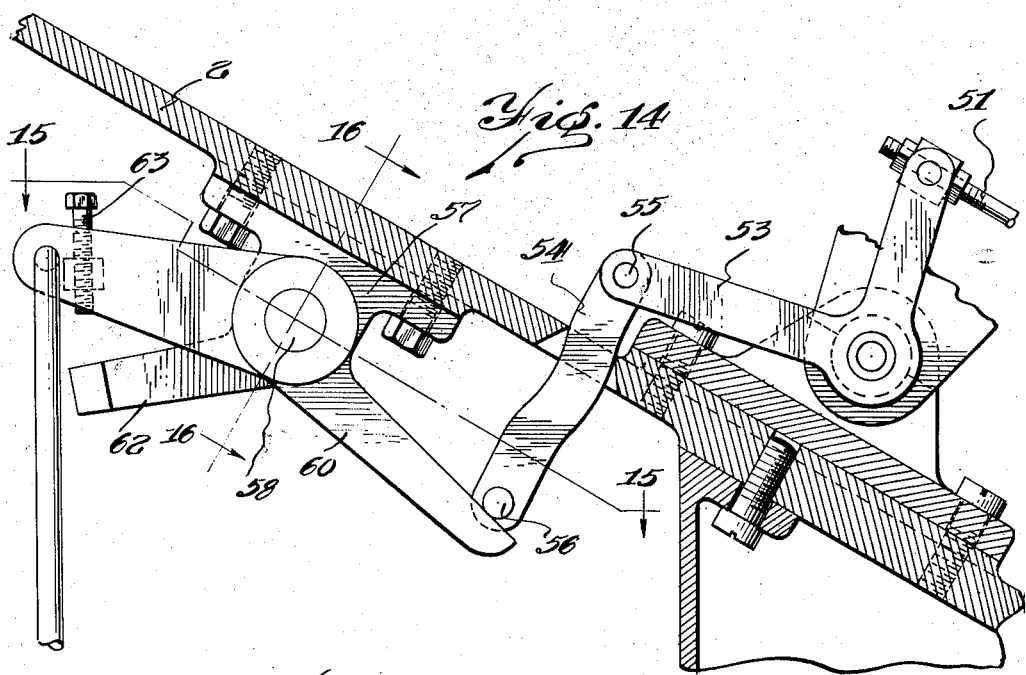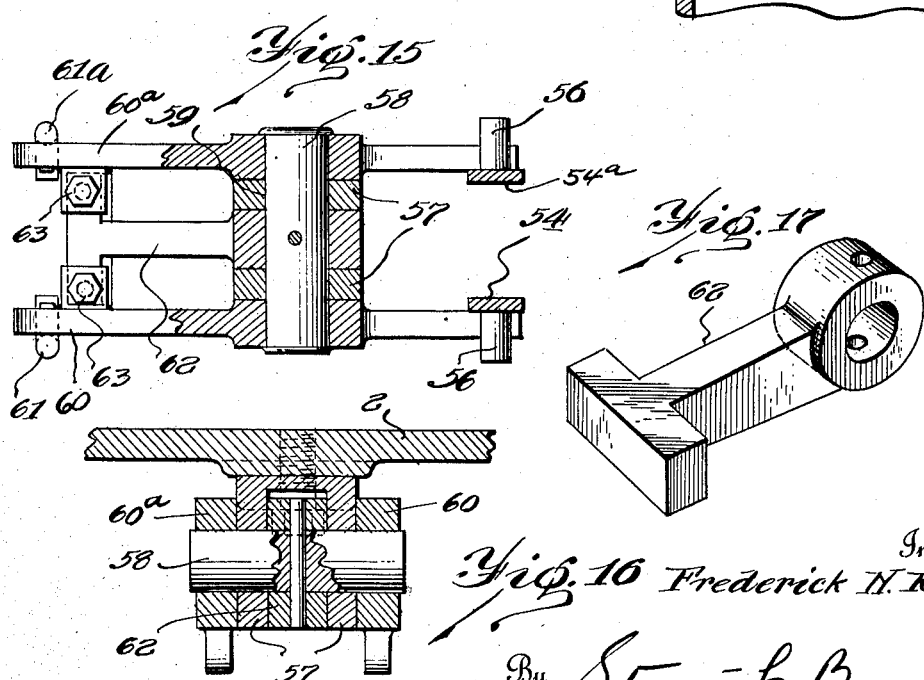

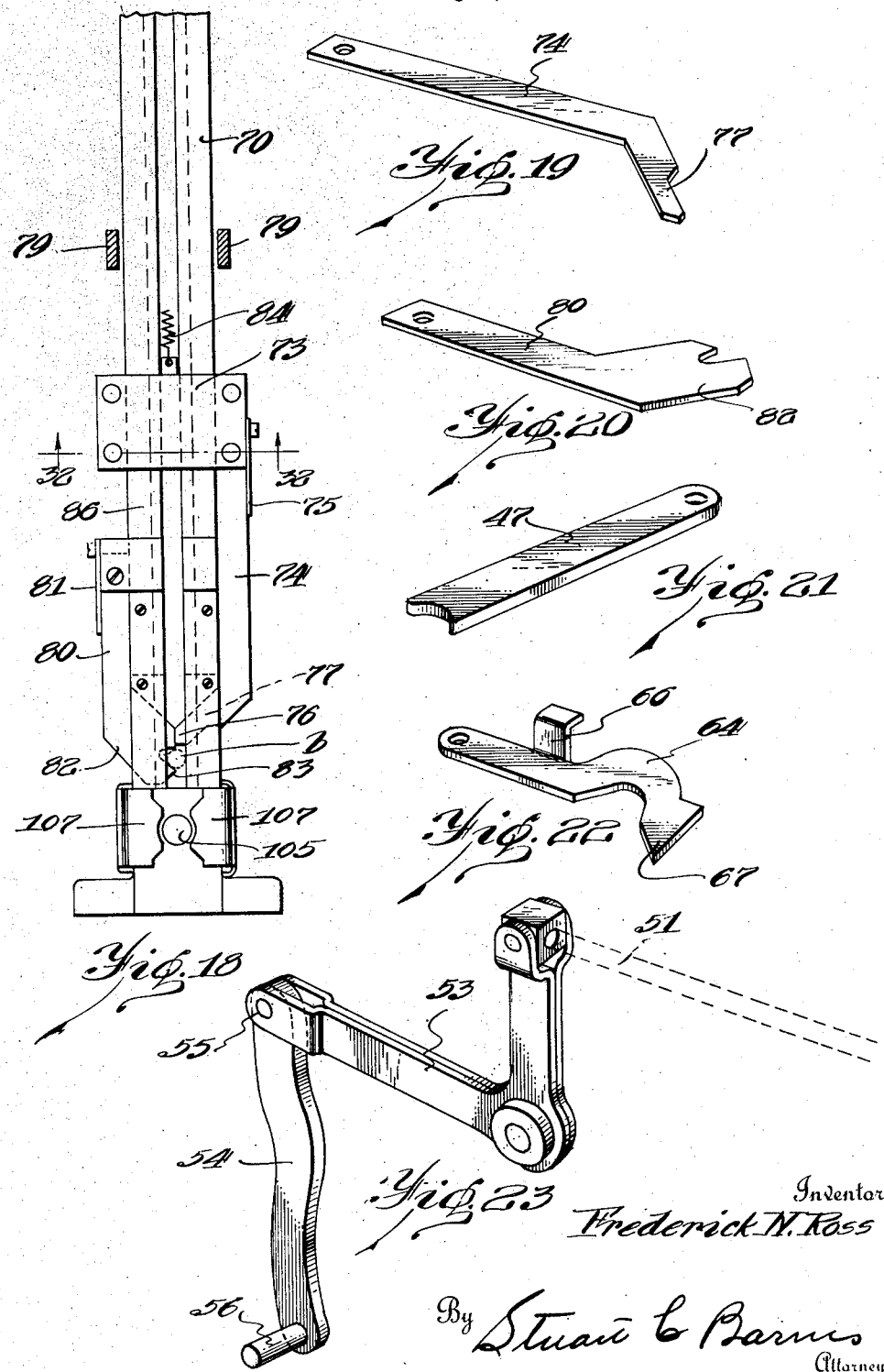

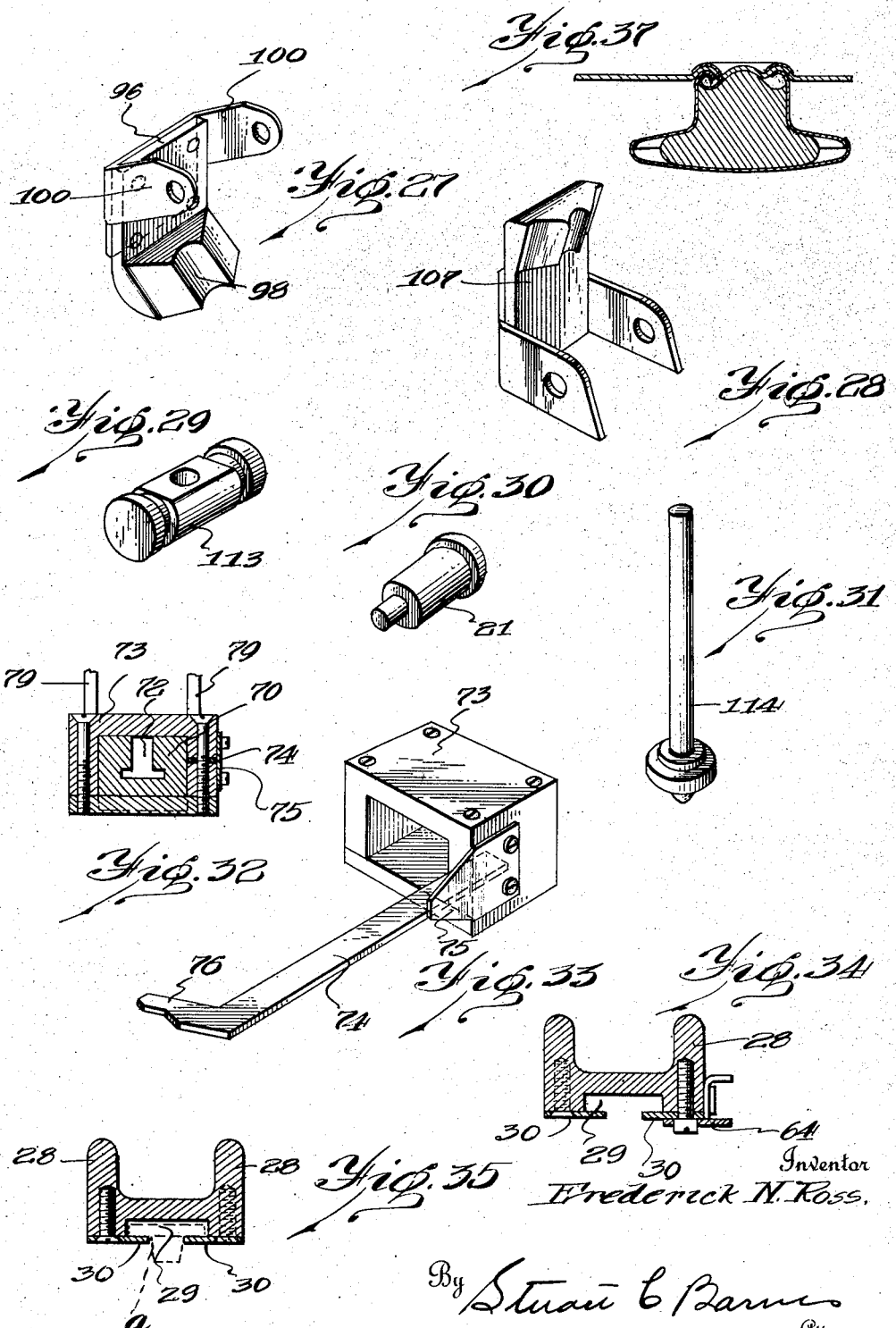

Patented June 2, 1925.

1,540,365

UNITED STATES PATENT OFFICE.

FREDERICK N. ROSS, OF PONTIAC, MICHIGAN, ASSIGNOR, BY MESNE ASSIGNMENTS, TO THE BUTTON ATTACHING MACHINE CO., OF WATERBURY, CONNECTICUT, A CORPORATION OF CONNECTICUT.

BUTTON-ATTACHING MACHINE.

Application filed August 4, 1923. Serial No. 655,589.

*To all whom it may concern:*

Be it known that FREDERICK N. Ross, citizen of the United States, residing at Pontiac, in the county of Oakland and State of Michigan, has invented certain new and useful Improvements in Button-Attaching Machines, of which the following is a specification.

This invention relates to a button attaching machine and more particularly to one arranged for attaching to a fabric what is known as a tack button.

In my application, Serial No. 587,309, I have described and claimed a tack button consisting of a tack provided with a plurality of prongs which are adapted to engage within a groove carried by the button head and clinched therein. The present machine is particularly designed to clinch this form of tack button on a fabric, but obviously the principle involved in this machine could be utilized in clinching any form of tack or staple button.

In attaching buttons to a workman's overalls, which is the most general use to which this machine is put, necessitates the attaching of two different sized buttons. These different sized buttons that are sewed on the over-alls can be so designed that both sizes take the same size tack or staple, the head of the button varying in diameter with the requirements.

The present method of attaching these buttons is for the operator to attach one size button with one machine, and when it is necessary to attach the other size button, the operator uses another machine, identical in construction, provided with the correct sized button. Obviously, the operator loses much time and his efficiency is decreased, because of the fact that he must position the fabric first in one machine and then in the other.

One of the objects of my invention is to overcome this difficulty by providing means whereby either of two different sized buttons may be fed to the button seat of the attaching means and the tack part of the button will be fed at the same time to the tack anvil or tack seat. A further object is to so construct the machine that the operator will not have to change his position in front of the machine and will always position his fabric upon the same part of the machine no matter which size button is to be attached.

The machine is so constructed that the operator can trip the machine with either foot by providing a pair of pedals, one pedal selecting one sized button to be fed to the attaching means, and the other pedal selecting the other sized button. The object of the design of the injecting means and the pedal control is such that a tack will be fed to the attaching means at every operation and either sized button fed thereto, depending upon the pedal depressed by the operator. The pedals are so arranged that both pedals actuate the clutch for starting the cycle of operation and each actuates its individual selector for selecting the right button to be injected into the attaching means.

A further object is to so construct the attaching means that the tack is held on the tack anvil and the button is held within the button seat until the tack and button are about to be clinched together at which time the holding means will be pushed aside to allow the clinching operation to be completed.

In the drawings:

Fig. 1 is a plan view of the machine.

Fig. 2 is a side elevation of the machine.

Fig. 3 is a vertical longitudinal section through the machine taken on the line 3—3 of Fig. 1.

Fig. 4 is a view similar to Fig. 3 some of the parts being shown in elevation and showing the parts positioned just before the injecting parts are actuated.

Fig. 5 is an enlarged detail showing the injecting carriage.

Fig. 6 is a sectional view through the attaching means taken on the line 6—6 of Fig. 3.

Fig. 7 is a section taken on the line 7—7 of Fig. 3 showing the button attaching means in elevation.

Figs. 8 to 11 inclusive are sectional details of the attaching means showing the different steps in clinching the button on to the fabric.

Fig. 12 is a bottom plan view of the button chutes showing the selector finger.

Fig. 13 is a section on the line 13—13 of Fig. 3 showing how the hoppers are pivoted and parts of the selector control.

Fig. 14 is a detail in elevation of the selector parts.

Fig. 15 is a section on the line 15—15 of Fig. 14.

Fig. 16 is a section on the line 16—16 of Fig. 14.

Fig. 17 is a detail in perspective of the stop for limiting the travel of a selector.

Fig. 18 is a plan view of the tack chute showing the tack injecting means.

Fig. 19 is a detail of the tack injecting finger.

Fig. 20 is a detail of the tack holding finger.

Fig. 21 is a detail of the button selector finger.

Fig. 22 is a detail of the button holding finger.

Fig. 23 is a detail in perspective of part of a selector.

Fig. 24 is a detail of the yoke connection on the tack chute for transmitting the thrust of the spring 102.

Fig. 25 is a detail of the connection for actuating the injecting slide from the reciprocating cam lever.

Fig. 26 is a detail of the selector cam.

Fig. 27 is a detail of the button finger for holding the button in the button seat.

Fig. 28 is a detail of the tack finger for holding the tack on the anvil.

Figs. 29 to 31 inclusive are details of parts of the machine.

Fig. 32 is a section on the line 32—32 of Fig. 18.

Fig. 33 is a detail of the tack injecting slide.

Fig. 34 is a transverse section taken on the line 34—34 of Fig. 12 with the section inverted to its upright position.

Fig. 35 is a transverse section taken on the line 35—35 of Fig. 12 with the same inversion.

Fig. 36 is a detail of the foot pedals.

Fig. 37 is a detail of the clinched button and tack.

A standard 1 is provided with a supporting plate 2 inclined at substantially 30 degrees with the horizontal. A tack hopper 3 and the button hoppers 4 are pivotally supported on the supporting plate 2. Subtended from the supporting plate is a housing 5 for the driving mechanism of the machine. A motor M is utilized for providing the power for driving the machine, the driving shaft 6 is connected to the motor and the housing supports a worm shaft 7 and worm 8 in suitable bearings 9. The shaft 7 extends through the housing and into a suitable clutch mechanism 10 of any standard design. A worm gear 11 rotatably mounted on the shaft 12 supported by the housing 5 is adapted to engage with the worm 8, the ratio between the worm gear and the worm is 12 to 1 and the standard clutch is adapted to throw out the driving connection at every twelfth revolution thus stopping the rotation of the worm gear at one complete revolution. Of course, it is obvious that we could use any gear reduction between the worm and worm gear which when coordinated with the clutch will make one complete cycle of operation before the clutch is disengaged.

A cam 13 is secured to the face of the worm gear and arranged to rotate with the said worm gear. A connecting rod 14 is provided with a pair of rollers 15 adapted to ride on the cam. The lever is provided also with an elongated slot 16 which is arranged to fit over the shaft 12. When the clutch is engaged so as to rotate the worm gear, the cam which also rotates therewith, will cause the rollers 15 and rod 14 to reciprocate back and forth, the said rollers bearing on the cam giving a positive movement in both directions to the rod 14.

In the position shown in Fig. 3, the machine is about to clinch the button onto the fabric, the button has already been injected into the button seat and the tack has been injected on to the tack anvil. This injecting means and the attaching of the button on to the fabric will be described later, but it will be seen by referring to Fig. 3, we have divided the cam 13 into the five distinct positions of the machine controlled by the cam. The lower roller 15 when engaging the edge of the cam marked "Idle" will be the position assumed by the parts when the machine is at rest. The division of the cam marked "Inject" will, when engaging the roller 15, cause the button and tack to be injected into the attaching means. The next step is the lowering of the plunger in the attaching means and is marked "To lower plunger" on the cam. In Fig. 3, the plunger has been lowered and the button and tack are about to be clinched on the fabric. As the lower roller 15 rides over the bump c of the cam marked "Clinch" the button and tack are clinched together. From there on the cam falls away and the rod 14 is raised thus separating the attaching mechanism of the machine until the machine reaches the idle position at which time the clutch is disengaged thus stopping the machine.

A plate 17 is bolted or otherwise secured to the supporting plate 2 (see Fig. 13). This plate is provided with a pair of upwardly projected ears 18 and the hoppers 4 have secured thereto a yoke bracket 19 which is provided with downwardly extended bifurcated ears adapted to span the ears 18 and a pin 21 is passed through the registering holes in the ears 18 and 20 thus pivoting the yoke member 19 to which the hoppers are secured to the plate 17 secured to the supporting plate 2 of the machine. The bracket 19 is provided with the upwardly extending ears 22 for journaling the shaft 23 which supports the inner ends of the rock arm levers 24.

Referring again to Fig. 3, the rock arm levers are provided with a transverse bolt 25 centrally located. The rod 14 is provided at its upper end with an enlarged portion provided with a slot 26 adapted to be slidably mounted over the bolt 25 so that the reciprocating movement of the rod 14 may be transmitted to the rock arm levers 24. The forward end of the rock arm levers are connected by a bolt 27 which adjustably supports the end of the plunger 90 carried by the attaching mechanism hereinafter to be described.

Each button hopper 4 (see Fig. 12) has a button chute 28 secured thereto and the bottom faces of these button chutes are grooved as at 29 and a pair of metal strips 30 are secured to the bottom of the chutes and are arranged to overlap the said grooves so as to form button chutes of a cross section adapted to guide the buttons in their travel from the hopper to the attaching mechanism (see Figs. 34 and 35). Again referring to Fig. 12, we will note that the button chutes converge and meet at a point adjacent to the attaching mechanism.

The button chutes have formed integral therewith at the apex of the chutes an inwardly extending guide 32 for slidably supporting the injecting carriage 103 (see Fig. 3). This injecting carriage is provided with a lug portion 33 adapted to slide in the slot 34 carried by the guide 32. The injecting carriage is provided with a slotted and upwardly extending lug 35 and a pin 36 carried by the lever 37 engages in this slot. The lever 37 is mounted on a pin 38 which is pivotally supported by the rock arm levers 24. Secured to the enlarged portion of the reciprocating rod 14 by a U bracket 39 (Fig. 5) having a vertical adjustment with respect to the rod 14 by means of the set screws 40 is a tripping lug 41. Pinned to the end of the pin 38 is a trip 42 provided with a shoulder 43 (see also Fig. 4) adapted to be engaged by the tripping lug 41 on its downward movement, the movement of the rod 14 causing the said lug 41 to bear on the shoulder 43 which will rotate the trip 42 (Fig. 4) and cause the counter-clockwise movement of a pin 44 carried by the shaft 38 which is adapted to engage the laterally projecting pin 45 (Fig. 5) carried by the lever 37 which is rotatably supported on the shaft 38.

As the rod 14 is pulled downwardly due to the rotation of the cam 13 causing the roller 15 carried by the said cam lever to ride on that portion of the cam marked "Inject", the lug 41, as has been described, makes a connection with the shoulder 43 to rotate the lever 37 in the direction of the arrow as shown in Fig. 5. As the lever 37 is connected with the injecting slide (Fig. 3) through the pin 36 the rotation of the said lever will cause the injecting slide to move forwardly.

A pin 46 (Fig. 5) has secured to its lower end a finger 47 the said pin passing through the injecting slide and held in place by means of the nut 48 and spring 49 interposed between the nut and the slide. Also mounted on this pin 46 is what we term a selector cam 50. This selector cam 50 and the finger 47 are secured to the pin 46. The spring 49 bears on the upper face of the selector cam. The selector cam 50 is adapted to be rotated by a mechanism connected with the foot pedals as will now be described.

Rods 51 are slidably supported through a plate 52 (Figs. 3, 4 and 13) which is secured to the end of the guide 32 and are connected at one end to the bell cranks 53 and 53ᵃ (Fig. 14) the other end of said rods bearing against the selector cam (see Figs. 26 and 14 to 17 inclusive.) Connecting links 54 and 54ᵃ (Fig. 14) are each pivoted to one end of the bell crank levers as at 55 and the lower end of these connecting links are provided with pins 56 projecting laterally therefrom. Secured to the underside of the supporting plate is a yoked bracket 57 and a pin 58 is tightly pressed in the holes 59 carried by the bracket 57. Specially constructed rock arm levers 60 and 60ᵃ are pivoted to this shaft 58, each having one end adapted to engage the pins 56 and the other end of each rock arm is connected to a rod 61 or 61ᵃ that is pulled downwardly by the foot pedals. A stop 62 is pinned to the shaft 58 and adjustable set screws 63 carried by the levers 60 and 60ᵃ are adapted to contact with this stop to limit the movement of the levers 60 and 60ᵃ.

As one of the rock arms is rocked by the movement of one of the rods 61 or 61ᵃ downwardly, the rock arm actuated will engage the pin 56 and raise one of the links 54 or 54ᵃ thereby rocking one of the crank arms 53 or 53ᵃ and pushing one of the rods 51 forwardly thereby causing the same to engage the selector cam 50 to rotate the same. The crank arms 53 and 53ᵃ connecting links 54 and 54ᵃ and rock arms 60 and 60ᵃ are separably operated by rods 61 and 61ᵃ and actuate the selector cam or rotate the same in either a clock-wise or counter-clockwise direction.

The selector cam 50 is secured to the pin 46 pivotally mounted in the injecting carriage and secured to the lower end of this pin is the finger 47. When the selector cam is rotated depending upon which pedal (Fig. 36) is depressed by the operator, the finger 47 will be partially rotated so as to assume the position as shown in Fig. 12 in full lines or the dotted lines. The shank *a* (Fig. 35) of the button is adapted to slide in the slot between the metal strips 30 secured to the underside of the button guide and arranged to project below the plane of the strips. When the finger 47 is rotated the end of the said finger is adapted to engage the button shank *a* and on the forward movement of the injecting carriage the finger will push the button forward in the chute and inject the same into the attaching means. The finger 64 (Fig. 12) pivoted to the underside of the button guide is held inwardly by the spring 65 which bears upon the projecting lug 66 carried by the finger 64. The tooth 67 of the finger is adapted to project inwardly across the button slide and to hold back the line of buttons when the button engaged by the finger 47 is being injected into the attaching means.

It is obvious from the foregoing description that the operator by depressing either foot pedal can select the size button he wishes to inject into the attaching means.

The machine is so arranged that a tack can be fed to the attaching means at every operation no matter which size button is fed. A tack chute 70 (Fig. 18) is secured to the tack hopper 3 (Figs. 1 and 2) which is pivoted as at 71 to the supporting plate 2. In Fig. 32 is shown the construction of the tack slide which is provided with a T-shaped groove 72 in which the tack is guided. A tack carriage 73 (Fig. 18) is slidable on the tack slide and secured to said carriage is a finger 74 which is pressed inwardly by the spring 75 also secured to the carriage. The forward end of the finger 74 projects inwardly as at 76 through a slot 77 (Fig. 3) in the side of the tack slide. A yoke member 78 (Figs. 3 to 5 inclusive) is secured to the button injecting carriage 103 and is provided with a downwardly projecting finger 79 which spans the tack chute (Fig. 18) and is arranged to engage the carriage 73 on the forward movement of the injecting carriage to force the tack carriage 73 forwardly carrying therewith the finger 74. Pivotally mounted on the tack slide is a finger 80 pressed inwardly by a spring 81 the free end of the finger provided with an inwardly extending portion 82 having tack retaining notch 83 for holding back the line of tacks fed down the chute. As the button injecting carriage 103 is pushed forwardly the finger 74 is normally positioned in the rear of one of the tacks, against the tack *b* thereby pushing the tack forwardly into the attaching means. As the said tack passes the inwardly projecting portion of the finger 80 the said finger is caused to be forced out of the way to allow the said tack to be projected out of the chute but the finger immediately springs back after the tack has passed to prevent other tacks from following. A spring 84 is secured to the carriage 73 for returning the said carriage back to its normal position. The tack chute is provided with elongated notch 86 (Fig. 3) on the underside in which the carriage 73 is adapted to slide the said elongated notch limiting the movement of the said carriage. A spring 87 (Fig. 3) is secured to the rear end of the button injecting carriage 103 for returning the same to its initial position when the forwardly projecting forces are released.

It is obvious from the foregoing description that the operator may select a size button at will and on pressing the pedal will so actuate the machine as to feed a tack and a button to the attaching means now to be described.

As described, the forward end of the rock arm levers 24 is provided with a stud bolt 27. In Figs. 3 to 6 inclusive the construction of the plunger head for holding the button is shown in detail. The guide 32 which is adapted to guide the button injecting carriage is provided with an enlarged portion at its forward end in which is slidably mounted a plunger 90. The upper end of the plunger 90 is provided with a reduced end 91 adapted to be secured to the bolt 27 carried by the rocking levers and an adjusting nut 92 is provided for adjusting the position of the plunger. The said plunger is also provided with an enlarged flange 93 and a compression spring 94 is interposed between the flange 93 and the plunger support thereby tending to maintain the plunger in the position as shown in Fig. 5. The flange 93 bears against the nut 95 screwed on to the support and limits the upward movement of the plunger under the pressure of the spring 94. A pair of button retaining fingers 96 are pivoted as at 97 to the support and are provided with an inwardly projecting button retaining lugs 98 as shown in Fig. 27 and Fig. 5. As the button is projected from the button chute it is injected between the lugs 98 carried by the fingers 96 as shown in Fig. 6, and securely held therein. The plates 99 rest upon the flattened top portion of the ears 100 carried by fingers 96 and are downwardly pressed by the springs 101 thus forcing the fingers 96 inwardly to retain the button and hold the same in the correct position during the first part of the attaching operation later to be described.

A yoke member 111 (Fig. 3 and Fig. 24) is secured to the underside of the tack chutes (see Figs. 3 and 24) the said yoke member is provided with downwardly and forwardly projecting arms 112 (Fig. 24) and transversely extending between the arms at the bend is a stud bolt 113 (Fig. 3 and Fig. 29) through which a rod 114 (Fig. 3) is slidably supported. A spring 115 bears against a washer 116 on the underside of the bolt 113 and tends to force the said yoke arms upwardly, the forwardly extending fingers 117 of the yoke arms bearing against the plate 110. It can be plainly seen that the spring 115 indirectly bears against the underside of the fingers 107 tending to force them upwardly so as to hold the tack in position on the top of the anvil (see Fig. 6). The fingers 107 are flattened on the underside below their pivot points and the plate which is forced against the underside of the fingers tends to resist the opening of the fingers when the fingers are forced apart.

In Figs. 6 to 11 inclusive I show the different steps in attaching the button to the fabric. In Figs. 6 and 7 the button and tack are positioned one on each side of the fabric at the beginning of the clinching operation.

As the roller 15 rides over that position of the cam 13 marked "To lower plunger" the rocking lever 24 will be forced downwardly, thereby causing the plunger and plunger supporting mechanism which carries with it the fingers 96 to be lowered. The fingers 96 bear on the fingers 107 (Fig. 9) during this downward movement and force the fingers 107 downwardly against the pressure of the spring 115. The fabric d is carried downwardly while the tack anvil 105 remains stationary thereby causing the tack b to pierce the fabric as shown in Fig. 9.

On further movement of the plunger and plunger supporting mechanism downwardly the tack will be forced into the shank on the button as shown in Fig. 10 and as the fingers 96 push the fingers 107 downwardly the inclined inner edges of the fingers 107 will ride on the flange of the tack thereby causing the fingers 107 to separate and allow the tack to freely enter the shank of the button. The fingers that hold the tack in position thereby release the tack when the same is projected within the shank of the button thereby guiding the tack until the tack enters the button shank at which time the shank will guide the prongs.

In Fig. 11 the fingers 107 have been pushed downwardly to the limit of their movement and the final downward movement of the rock arm levers 24 when the rollers are riding over the hump c, will cause the plunger 90 to be pushed downwardly against the pressure of the spring 94 thereby causing the button head to be forced down on the tack and causing the prongs of the tack to clinch within the hollow interior of the button (Fig. 37) thereby clinching the button on to the fabric. The downward movement of the button head forces the fingers 96 apart, thus freeing the button. During this last clinching operation the tack anvil is slightly depressed against the tension of the spring 106 until the lower end of the tack anvil 120 abuts the adjustable stud 121 carried by the tack anvil support 102. The spring 106 bearing on the tack anvil is sufficiently strong to hold the tack anvil stationary with respect to the button head until the last part of the clinching operation when the resistance of the spring is overcome and allows the tack anvil to be forced downwardly a slight distance. A set screw 104 and a key 193 securely lock the tack anvil support to the supporting plate 2.

The pedals 140 and 140ª (see Fig. 36) are pivotally supported in any suitable manner to the machine frame and the pedals are provided with the laterally extending metal strips 141 and 141ª to which the connecting rods 61 and 61ª are connected as shown so that a downward movement of the pedals will cause the attached connecting rods to be pulled downwardly thus actuating the selector cam to select the proper sized button. The pedals are also provided with the metal strips 142 and 142ª to which is secured a yoke 143 formed on the end of a connecting rod 144 connected with the clutch operating mechanism.

In the operation of the machine the operator depresses the pedal which is set to control the proper sized button which is desired. In Fig. 36 I have shown by the dotted lines the position assumed by the pedal 140ª when it is depressed. It will thus be seen that this will pull the rod 61ª and the clutch rod 144 without actuating the connecting rod 61. The machine is so constructed that on the depressing of the pedal the selector cam is first actuated to position the selector finger so as to select the desired button. When the pedal is depressed to its fullest extent the clutch mechanism is so timed that it will be tripped at the end of the stroke thereby starting the operating mechanism for injecting the button that has been selected into the attaching means and for clinching the button and tack on the fabric.

What I claim is:

1. In a button attaching machine, the combination of means for attaching a button to a fabric, and means for automatically feeding buttons of several sizes to the attaching means including a manually controlled selector actuated by the feeding means for determining the size button to be fed to said attaching means.

2. In a button attaching machine, the combination of means for attaching a button to a fabric, a button feeding mechanism for feeding buttons of different sizes to said attaching means, operating mechanism for actuating the button feeding mechanism and button attaching means, means for selecting the size button to be fed, and means for actuating said selecting means and for also starting the operation of the machine in one cycle of operation.

3. In a button attaching machine, the combination of means for attaching buttons to a fabric, feeding mechanism for feeding different sized buttons to the attaching means, operating mechanism for actuating the button feeding mechanism and for actuating the button attaching means, and means for selecting the button to be fed to the attaching means and including a manually controlled selector and means for setting the machine into operation for actuating the selector whereby a button is selected from one of the several sizes and fed to said attaching means.

4. In a button attaching machine, the combination of means for attaching buttons to a fabric, feeding mechanism for feeding different size buttons to the attaching means, operating mechanism for actuating the button feeding mechanism and for actuating the button attaching means, and means for selecting the button to be fed to the attaching means, and including a manually controlled selector, and means for setting the operating mechanism into operation to actuate the selector whereby a button is simultaneously selected from one of the several sizes as the machine is set into operation.

5. In a button attaching machine, the combination of means for attaching a button to a fabric, selectable means for feeding one of several sized buttons to said attaching means, means for setting the machine into operation, and means controlled by said last mentioned means for controlling the selecting means.

6. In a button attaching machine, the combination of means for attaching buttons to a fabric, feeding mechanism for feeding different size buttons to the attaching means, means for selecting a button from the several sizes; operating mechanism for actuating the button feeding mechanism, button attaching means and button selecting means, and means for setting into operation the said operating mechanism.

7. In a button attaching machine, the combination of means for attaching buttons to a fabric, feeding mechanism for feeding different size buttons to the attaching means and including a plurality of chutes for guiding the buttons, means for selecting a button from the several sizes, operating mechanism for actuating the button feeding mechanism, the button attach-
ing means and the button selecting means, and means for setting into operation the said operating mechanisms.

8. In a button attaching machine, the combination of means for attaching buttons to a fabric, feeding mechanism for feeding different size buttons to the attaching means, and a manually controlled selector including a finger actuated by the feeding mechanism for selecting a button of the desired size.

9. In a button attaching machine, the combination of means for attaching buttons to a fabric, feeding mechanism for feeding different size buttons to the attaching means and including a plurality of chutes for guiding the buttons, a manually controlled selector for selecting a button from any of said chutes, and means for setting into operation the button attaching means and the feeding mechanism, whereby the said selector is actuated by the feeding mechanism to select and inject the desired button into the fastening means and the attaching means is actuated to clinch the button on the fabric.

10. In a button attaching machine, the combination of means for attaching buttons to a fabric, feeding mechanism for feeding different size buttons to the attaching means and including chutes for guiding the buttons, selector means for selecting a button of the desired size and including a finger arranged to engage behind a button guided in a chute, and means for actuating the said selector means whereby the finger injects the button of the desired size into the attaching means.

11. In a button attaching machine, the combination of means for attaching buttons to a fabric, feeding mechanisms for feeding different size buttons to the attaching means, operating mechanism including movable carriage provided with a selector for selecting a button of the desired size, and means for setting into operation the operating mechanism whereby the slidable carriage is actuated to inject the button selected into the attaching means.

12. In a button attaching machine, the combination of means for attaching buttons to a fabric, feeding mechanisms for feeding different size buttons to the attaching means and including chutes for guiding the buttons, operating mechanism including a slidable injecting carriage provided with a selector arranged to select a button from the desired button chute, and means for setting into operation the operating mechanism whereby the selector is actuated to select the proper button and the slidable injecting carriage is actuated to inject the button into the attaching means.

13. In a button attaching machine, the combination of means for attaching buttons to a fabric, feeding mechanism for feeding different size buttons to the attaching means, operating mechanism including a movable carriage provided with a selector pivoted thereon and arranged to select a button of the desired size, and means for setting into operation the operating mechanism for actuating the selector to select the proper button and to inject the button into the attaching means.

14. In a button attaching machine, the combination of means for attaching buttons to a fabric, feeding mechanism for feeding different size buttons to the attaching means and including chutes for guiding the buttons, operating mechanism including a movable carriage provided with a finger pivoted thereon arranged to selectively engage a button guided in one of the chutes, and means for setting into operation the operating mechanism including the selector finger and for moving the carriage for injecting the selected button into the attaching means.

15. In a button attaching machine, the combination of means for attaching buttons to a fabric, feeding mechanism for feeding different size buttons to the attaching means, operating mechanism including a sliding carriage provided with a selector pivoted thereon for selecting a button of the desired size, and means for setting the operating mechanism into operation whereby the pivoted selector is positioned to select the proper button and to inject the same into the attaching means.

16. In a button attaching machine, the combination of means for attaching a button to a fabric, feeding mechanism for feeding different size buttons to the attaching means, operating mechanism including a movable carriage, a selector cam pivotally supported on said carriage, a selector finger connected with said cam, and means for actuating the cam for positioning the selector finger to select a button of the desired size.

17. In a button attaching machine, the combination of means for attaching a button to a fabric, feeding mechanism for feeding buttons of different size to said attaching means, operating mechanism including a movable carriage, a selector cam pivotally mounted on the carriage, a selector finger supported by the carriage and connected with the selector cam, and means for setting into operation the operating mechanism and for actuating the selector cam to a position where the finger selects a button of the desired size, said operating means moving the carriage to inject the selected button into the attaching means.

18. In a button attaching machine, the combination of means for attaching a button to a fabric, feeding mechanism for feeding buttons of different size to said attaching means, and operating mechanism including a carriage, a selector cam pivotally supported on said carriage, a selector finger also supported thereon and connected with the selector cam, and a rod adapted to be reciprocated and arranged to engage the selector cam to actuate the same for selecting the proper button to be fed to said feeding mechanism.

19. In a button attaching machine, the combination of means for attaching a button to a fabric, feeding mechanism for feeding different size buttons to the attaching means, and operating mechanism including a pair of foot-operated pedals, a movable carriage, a selector cam pivotally mounted on the carriage, a selector finger supported by said carriage and connected with the cam, and means connected with the pedals for actuating the cam whereby as one pedal is depressed the cam is actuated to position the finger for selecting a button of the desired size.

20. In a button attaching machine, the combination of means for attaching a button to a fabric, feeding mechanism for feeding different size buttons to the attaching means, operating mechanism for actuating the button feeding mechanism and button attaching means, means for selecting a button from the several sizes, and pedals for controlling the operating mechanism and button selecting means, whereby when either of the pedals is depressed the selecting means is actuated to select a button of the desired size and the machine is started in one cycle of operation.

21. In a button attaching machine, the combination of means for attaching a button to a fabric, button feeding mechanism for feeding buttons of different sizes to said attaching means, operating mechanism for actuating the button feeding mechanism and button attaching means, means for selecting a button from the several sizes, pedals for controlling the operating mechanism and selecting means, whereby a button of the proper size may be selected and injected into the attaching means.

22. In a button attaching machine, the combination of means for attaching a button to a fabric, feeding mechanism for feeding different size buttons to the attaching means, operating mechanism for actuating the button feeding mechanism and button attaching means, and including a movable carriage provided with a selector, and means for actuating said selector, including pedals whereby a button of the desired size may be selected by depressing the pedal so connected with the selector as to select the button desired.

23. In a button attaching machine, the combination of means for attaching a button to a fabric, feeding mechanism for feeding buttons of different sizes to said attaching means, means for selecting the button to be fed including a selector cam and finger connected therewith, means for actuating the selector cam including pedals, and means for adjustably limiting the travel of said actuating means, whereby the said finger is correctly positioned to select a button of the desired size when one of said pedals is depressed.

24. In a button attaching machine, the combination of means for attaching a button to a fabric, feeding mechanism for feeding buttons of different sizes to said attaching means, means for selecting a button of the desired size including a selector cam and finger, means for actuating the selector cam and finger including a pedal control therefor, and means for limiting the travel of said pedal whereby the finger is moved the proper distance to correctly position the same to select a button of the desired size.

25. In a button attaching machine, the combination of means for attaching a button to a fabric, feeding mechanism for selectively feeding buttons of different sizes to said attaching means, means for selecting the button to be fed, and pedals for controlling the said selecting means and for starting the machine in one cycle of operation.

26. In a button attaching machine, the combination of means for attaching a button to a fabric, button feeding mechanisms for feeding several sizes of buttons to said attaching means, operating mechanism including a power driven cam, a connecting rod connected with said cam arranged to be reciprocated when said cam is rotated, means for selecting a button from one of said feeding mechanisms and injecting the same into the fastening means and including a movable carriage, connections between said movable carriage and the reciprocating rod for moving the carriage, and means for setting the operating mechanism into operation to reciprocate the connecting rod, whereby the carriage is moved to inject the selected button into the attaching means and the attaching means is actuated to clinch the button in the fabric.

27. In a button attaching machine, the combination of means for attaching a button to a fabric, feeding mechanisms for feeding buttons of several sizes to the attaching means, operating mechanism for actuating the feeding mechanism and button attaching means and including a movable carriage provided with a finger for selecting a button from one of said feeding mechanisms, means for setting into operation the operating mechanism whereby the finger is positioned behind a button and the carriage and finger is moved to inject the button to the attaching means, and means for returning the injecting carriage to its normal position after injecting the button into the attaching means.

28. In a button attaching machine, the combination of means for attaching a button to a fabric, feeding mechanism including button chutes for feeding buttons to said attaching means, means for selecting a button from one of the said chutes, means for injecting the selected button into the attaching means and including a movable carriage, operating mechanism including a reciprocating rod and power transmitting means connecting the movable carriage and the reciprocating rod whereby the injecting carriage is moved to push the button selected from the chute into the attaching means.

29. In a button attaching machine, the combination of means for attaching a button to a fabric, feeding mechanism including a button chute for feeding buttons to the attaching means, means for separating a button, means for injecting the separated button into the attaching means and including a movable carriage, operating mechanism including a reciprocating rod, a rocking lever pivotally supported and connected with the movable carriage, a lug secured to the reciprocating rod, connections carried by the rocking lever arranged to be engaged by the lug carried by the reciprocating rod to impart a rotating movement to the lever for moving the said carriage to push the separated button down the chute and into the attaching means.

30. In a button attaching machine, the combination of means for attaching a button to a fabric, means for feeding buttons to said attaching means and including a button injecting carriage, mechanism for feeding tacks to said attaching means and including a tack chute and a tack injecting carriage slidable thereon, and means carried by the button carriage adapted to engage the tack carriage for simultaneously feeding a tack and button to the attaching means.

31. In a button attaching machine, the combination of means for attaching a button to a fabric, means for feeding buttons to said attaching means and including a movable button injecting carriage, mechanism for feeding a tack to the fastening means including a chute and a tack injecting carriage slidable thereon, means carried by the tack carriage adapted to engage a tack guided within the tack chute and means carried by the button carriage adapted to engage the tack carriage, whereby a tack and button are simultaneously injected into the attaching means.

32. In a button attaching machine, the combination of means for attaching a button to a fabric, means for feeding and injecting buttons to the attaching means, tack feeding mechanism including a chute for guiding the tacks and a tack carriage slidable thereon, the said tack carriage provided with a member adapted to engage behind a tack, and means carried by the button feeding and injecting means adapted to engage the tack carriage for simultaneously injecting the tack and button into the attaching means.

33. In a button attaching machine, the combination of means for attaching a button to a fabric, means for feeding and injecting a button to the attaching means and including a slidable injecting carriage, tack feeding mechanism for feeding tacks to the attaching means including a chute for guiding the tacks and a tack carriage slidable on the tack chute, said tack carriage provided with means for engaging a tack, a yoke member carried by the button injecting carriage adapted to engage with the tack carriage, and means for setting the button feeding and injecting mechanism into operation whereby the button injecting carriage and tack injecting carriage are simultaneously actuated to inject a button and tack to the attaching means.

34. In a button attaching machine, the combination of means for attaching a button to a fabric, means for feeding and injecting a button to the attaching means, tack feeding mechanism for feeding tacks to the attaching means and including a chute for guiding the tacks, a tack injecting carriage slidable on the tack chute and provided with means for engaging a tack, means carried by the button feeding and injecting means adapted to engage the tack injecting carriage to move the same for simultaneously injecting a button and tack to the fastening means, and means for returning the tack injecting carriage to its normal position after the tack has been injected into the said attaching means.

35. In a button attaching machine, the combination of means for attaching a button to a fabric, feeding mechanism for feeding different sized buttons to the attaching means including chutes for guiding the buttons, operating mechanism for actuating the button feeding mechanism and button fastening means and including a carriage provided with a selector finger, retaining fingers carried by the button chutes near the ends thereof, means for pressing the said fingers inwardly, the said fingers being arranged to hold back a line of buttons in the chutes, and means for setting the operating mechanism into operation whereby the injecting carriage is moved to cause the selector finger to force a button by one of the retaining fingers and inject a button into the fastening means, the said retaining finger being pushed out of the way as the button is injected but arranged to spring back into position to retain the rest of the buttons in the chute.

36. In a button attaching machine and in the attaching means thereof, the combination of means for supporting a fabric, a tack anvil located below the fabric and adapted to support a tack, means for holding a tack in place on the tack anvil, button supporting mechanism including a button seat and means for holding a button in place on the seat, and means for lowering the button supporting mechanism to force the button and tack together, the said tack supporting means adapted to hold the tack in position until the button is lowered into contact with the tack when further movement of the button mechanism will successively release the tack holding means and the button holding means to allow the button and tack to be clinched together through the fabric.

37. In a button attaching machine and in the attaching means thereof, the combination of means for supporting a fabric, means for supporting a tack below the fabric, fingers for supporting a button above the fabric, and means for lowering the button supporting fingers whereby the said button holding fingers bear down on the tack holding means to cause the tack holding means and button holding fingers to successively separate thereby successively releasing the tack and button.

38. In a button attaching machine and in the attaching means thereof, the combination of means for supporting a fabric, a tack anvil for supporting a tack below the fabric, and means slidably and pivotally supported on the tack anvil for holding the tack thereon, means for holding and supporting a button above the fabric, means for lowering the button supporting and holding means whereby the button holding means contact with and force the tack holding means downwardly causing the same to separate and release the tack, and means for then ejecting the button from the button holding means to clinch the button on the tack.

39. In a button attaching machine and in the attaching means thereof, the combination of means for supporting a fabric, a tack anvil for supporting a tack below the fabric, a pair of fingers pivotally and slidably supported by said tack anvil, means for forcing the fingers together to hold the tack onto its support, button holding mechanism including a pair of fingers for holding the button, means for lowering the button mechanism whereby the said button holding fingers contact with the tack holding fingers to force the latter downwardly thereby causing the tack holding fingers to separate and release the tack, and means for then ejecting the button from the button holding means to clinch the button on the tack.

40. In a button attaching machine and in the attaching means thereof, the combination of means for supporting a fabric, a tack anvil for supporting the tack below the fabric, a pair of fingers pivotally and slidably supported, means for forcing the fingers together to hold the tack on its support, button holding mechanism including a button seat and a pair of fingers and means for forcing the said fingers together to hold a button on the button seat, and means for lowering the said button mechanism whereby the button holding fingers contact with the tack holding fingers to force the latter downwardly thereby causing the tack holding fingers to release the tack, further movement of the said button mechanism causing the button seat to advance ahead of the rest of the button mechanism thereby forcing the button out from the button holding fingers to release the button and clinch the same on the tack.

41. In a button attaching machine, the combination of a support, a button supporting and holding mechanism, button feeding mechanism including a button hopper and a chute secured thereto, said chute also secured to the button supporting and holding means, tack supporting means, tack feeding mechanism including a tack hopper and a tack chute secured thereto, the tack supporting means also secured to the chute, said button feeding mechanism and tack feeding mechanism being pivotally mounted on the support, and means for lowering the button mechanism onto the tack mechanism to clinch the button and tack together.

42. In a button attaching machine, the combination of a support, means for attaching a button to a fabric, button feeding mechanism connected to the attaching means, and tack feeding mechanism connected to the attaching means, the said button and tack feeding mechanism being pivotally mounted on the support.

43. In a button attaching machine, the combination of means for supporting a tack including yieldable fingers and an anvil, means for supporting a button including yieldable fingers and a hammer, and means for causing relative movement between the button and tack supporting means to successively release the tack and button and then to clinch the same.

44. In a button attaching machine, the combination of means for supporting a tack including a plurality of fingers that can be spread and an anvil, means for supporting a button including a plurality of fingers that can be spread and a hammer, the tack supporting means and the button supporting means being initially spaced, and means for causing relative movement between the tack and button supporting means to successively spread the fingers to successively release the tack and button and to bring the tack and button together and clinch the same.

45. In a button attaching machine, the combination of means for supporting a tack including an anvil and a plurality of yieldable and spreadable fingers arranged substantially parallel to the axis of the tack supported on the anvil by the fingers, means for supporting the button including a plurality of yieldable and spreadable fingers which are substantially parallel with the axis of the button which they support and including further a hammer, and means for causing relative movement between the tack and button supporting means to bring the fingers together to spread one set of fingers for releasing the tack or button supported thereby and to bring the hammer and anvil together to spread the other set of fingers and then clinching the button and tack together.

46. In a button attaching machine, the combination of spreadable means for supporting a tack and including an anvil, spreadable means for supporting a button and including a hammer, and means for causing relative movement between the parts, thereby causing the holding means to successively release the tack and button and the hammer and anvil to clinch the button and tack together.

47. In a button attaching machine, the combination of tack supporting means including spreadable members and an anvil, a button supporting means including spreadable members and a hammer, and means for causing relative movement between the supporting members including the anvil and the hammer to bring the button and tack together to successively release the yieldable holding members and then to clinch the button and tack together.

In testimony whereof he has affixed his signature.

FREDERICK N. ROSS.